United States Patent
Schripsema et al.

(10) Patent No.: US 6,979,989 B2
(45) Date of Patent: Dec. 27, 2005

(54) MAXIMUM POWER SENSOR FOR PHOTOVOLTAIC SYSTEM

(75) Inventors: Jason Schripsema, Berkeley, CA (US); Michael Anthony Johnston, Boulder, CO (US); Alysha J. Grenko, Newark, DE (US)

(73) Assignee: Heritage Power LLC, Atlanta, GA (US)

( * ) Notice: Subject to any disclaimer, the term of this patent is extended or adjusted under 35 U.S.C. 154(b) by 0 days.

(21) Appl. No.: 10/967,509

(22) Filed: Oct. 18, 2004

(65) Prior Publication Data

US 2005/0052172 A1    Mar. 10, 2005

Related U.S. Application Data

(63) Continuation of application No. PCT/US02/25872, filed on Aug. 13, 2002.
(60) Provisional application No. 60/373,286, filed on Apr. 17, 2002.

(51) Int. Cl.[7] .............................................. G05F 5/00
(52) U.S. Cl. ........................ 323/303; 323/906; 320/101
(58) Field of Search ................................ 323/906, 274, 323/303; 320/101

(56) References Cited

U.S. PATENT DOCUMENTS

| | | | | |
|---|---|---|---|---|
| 3,731,474 A | * | 5/1973 | Tsuruishi | 368/205 |
| 3,997,830 A | | 12/1976 | Newell et al. | |
| 4,410,930 A | * | 10/1983 | Yachabach | 362/145 |
| 4,580,090 A | * | 4/1986 | Bailey et al. | 323/303 |
| 4,622,509 A | * | 11/1986 | Spruijt | 320/130 |
| 5,196,781 A | | 3/1993 | Jamieson et al. | |
| 5,703,468 A | * | 12/1997 | Petrillo | 320/101 |
| 5,867,011 A | * | 2/1999 | Jo et al. | 323/299 |
| 5,932,994 A | * | 8/1999 | Jo et al. | 323/222 |
| 6,545,211 B1 | * | 4/2003 | Mimura | 136/244 |
| 6,590,793 B1 | * | 7/2003 | Nagao et al. | 363/95 |
| 6,661,203 B2 | * | 12/2003 | Wolin et al. | 320/134 |

OTHER PUBLICATIONS

Printouts from website for Heliotronics, Inc. News, "Heliotronics products as reliable as sunrise".

* cited by examiner

*Primary Examiner*—Bao Q. Vu
(74) *Attorney, Agent, or Firm*—Burr & Brown

(57) ABSTRACT

A maximum power level sensor and method for reliably providing instantaneous estimates of maximum power level for a photovoltaic system including one or more photovoltaic cells under prevailing conditions of irradiance, array temperature and spectrum of sunlight. The maximum power level sensor produces a reference voltage signal which is proportional to the maximum power level of the photovoltaic system. The maximum power level sensor comprises a reference circuit including at least one reference photovoltaic cell and a thermistor network in parallel with the reference cell. The thermistor network comprises at least one negative temperature coefficient thermistor, at least one resistor in parallel with the thermistor, and at least one resistor in series with the thermistor and the parallel resistor. The thermistor is positioned in or on the photovoltaic array. The reference cell is preferably constructed of materials which are similar to those of the photovoltaic cells in the photovoltaic system.

33 Claims, 3 Drawing Sheets

MAXIMUM POWER SENSOR FOR PHOTOVOLTAIC SYSTEM

CROSS-REFERENCE TO RELATED APPLICATIONS

This application is a continuation of PCT application PCT/US02/25872, filed Aug. 13, 2002, the entirety of which is incorporated herein by reference.

This application claims the benefit of U.S. Provisional Patent Application No. 60/373,286, filed Apr. 17, 2002, the entirety of which is incorporated herein by reference.

FIELD OF THE INVENTION

The present invention is directed to an apparatus for estimating the maximum power output of a photovoltaic system which includes a photovoltaic array comprising one or more photovoltaic cells under prevailing conditions. The present invention is further directed to a method for estimating such maximum power output.

In particular, the present invention is directed to an apparatus which generates a voltage signal which is indicative of the maximum power level of a photovoltaic array at prevailing plane of array irradiance and array operating temperature. The present invention is further directed to such an apparatus which also accounts for the spectral response of the photovoltaic cell or cells in the photovoltaic system. The present invention is also directed to a method which generates such voltage signals.

Further, the present invention is directed to an apparatus which predicts the performance of a photovoltaic system and to an apparatus which provides a reference from which to gauge the power which should be produced by a photovoltaic system under prevailing conditions, if the photovoltaic system is operating properly. The present invention is also directed to methods for performing such prediction, and/or for providing such a reference. In addition, the present invention is directed to an apparatus that can be used to provide an indication of the efficiency of a PV system (AC power relative to estimated maximum power level) and/or an indication of potential problems within a photovoltaic system, and the present invention is directed to a method of providing such an indication.

In addition, the present invention is directed to an apparatus which estimates the energy which should be produced by a photovoltaic system over a period of time, which accounts for the plane of array irradiance and the array temperature conditions which occurred over the period of time, and the present invention is directed to a method of making such estimates.

Also, the present invention is directed to an apparatus for assessing the performance of a plurality of grid-connected photovoltaic systems, and to a method for assessing such performance.

BACKGROUND OF THE INVENTION

Photovoltaic system performance has come under closer and closer scrutiny in recent years as alternative energy sources have become more important and more common, and as grid-connected systems have become more prevalent. One of the critical challenges in assessing the performance of a large number of deployed systems is the high cost of conventional tools necessary to evaluate system performance.

The present invention is directed toward providing an apparatus and a method for assessing the performance of photovoltaic systems. In particular, the present invention is directed to providing an apparatus and a method which can satisfy the need for a simple, accurate and less expensive way to evaluate the performance of any particular photovoltaic system and continuously estimate the theoretical power (referred to herein as the "maximum power level") that should be produced by the photovoltaic system at any given instant under the then-prevailing conditions. If the instantaneous levels of power being produced by the photovoltaic system are not meeting such estimated power levels, it would then be apparent that there may be one or more problems with the photovoltaic system, which problem(s) is/are adversely affecting the power being produced by the photovoltaic system. Accordingly, steps could immediately be undertaken toward diagnosing and then correcting the problem or problems.

Relatively expensive pyranometers have been used in the past for sensing irradiance of light striking photovoltaic arrays. Irradiance is, however, just one of the factors which affect the maximum power level of a photovoltaic system. In particular, the temperature of the photovoltaic cells in the photovoltaic system also affects the maximum power level. In addition, the spectral response of the photovoltaic cell or cells, and the spectrum of sunlight at any given instant also affect the maximum power level. Use of a pyranometer alone does not account for temperature effects. If a pyranometer were combined in a system with one or more thermocouples or thermistors for sensing the temperature at one or more locations on the photovoltaic array, an expensive data logger would be needed for reading and interpreting such data.

Another factor which complicates estimation of the maximum power level of a photovoltaic system is the fact that irradiance, temperature and spectrum of sunlight typically change over the course of each day, and in some cases, one or more of these properties change almost continuously for a period of time. In addition, estimation of the maximum power level is further complicated by the fact that irradiance and temperature each affect the maximum power level non-linearly, as discussed below. For example, FIG. 1 is a graph showing the character of different current-voltage curves (each such curve is referred to herein as an "IV curve") for a particular representative photovoltaic cell at two different irradiance levels, with temperature and spectrum of sunlight being constant. As can be seen from FIG. 1, even at constant temperature and spectrum of sunlight, a change in irradiance causes a photovoltaic array to operate according to a different IV curve.

Conventional calculations of predicted array maximum power typically use at least (1) one or more silicon solar cells to measure irradiance, (2) one or more thermistors or thermocouples to measure an array's operating temperature, and (3) one or more data loggers equipped to read the temperature data.

The present invention is directed to a simple, accurate and less expensive apparatus and method that can be used to continuously estimate the maximum power level of a photovoltaic system while taking into account the instantaneous variations in plane of array irradiance and temperature.

SUMMARY OF THE INVENTION

In accordance with the present invention, there is provided a simple maximum power level sensor and method for reliably providing instantaneous estimates of the maximum power level for a photovoltaic system including one or more photovoltaic cells (or for a single photovoltaic cell) under prevailing conditions of plane of array irradiance (referred to herein as "POA irradiance"), array temperature and spectrum of sunlight. The maximum power level sensor of the present invention produces a reference voltage signal which is proportional to the maximum power level of the photovoltaic system.

The photovoltaic cells in a photovoltaic array (referred to herein as a "PV array") of a photovoltaic system (referred to herein as a "PV system") whose maximum power level is being estimated are referred to herein as "PV cells." Similarly, an individual photovoltaic cell is referred to herein as a "PV cell."

According to the present invention, there is provided a maximum power level sensor for estimating the maximum power level of a PV system (or of a single PV cell, i.e., a PV module), the maximum power level sensor comprising a circuit (referred to herein as a "reference circuit") including at least one reference PV cell (referred to herein as a "reference cell") and a thermistor network in parallel with the reference cell. The thermistor network comprises at least one negative temperature coefficient thermistor (i.e., a thermistor whose resistance varies inversely with temperature) at least one resistor (referred to herein as a "parallel resistor") in parallel with the thermistor, and at least one resistor (referred to herein as a "series resistor") in series with the thermistor and the parallel resistor. The at least one thermistor is positioned on or in the PV array.

The reference voltage signal, referred to above, which is produced by the maximum power level sensor of the present invention, and which is proportional to the maximum power level of the photovoltaic system, is the DC voltage drop across the thermistor network. Accordingly, there may further be provided at least one voltage sensor which senses the voltage drop across the thermistor network to provide a reference voltage readout.

The reference PV cell is preferably constructed of materials which are similar to those of the PV cells (or the single PV cell) in the PV system.

In use, the thermistor of the maximum power level sensor is preferably arranged on the bottom of one of the PV cells in the PV array (or on the bottom of the single PV cell).

Typically, the maximum power level sensor of the present invention is used together with a PV system which is deployed on or near the earth's surface (e.g., on a roof of a building or house). However, other applications are possible, e.g., the maximum power level sensor may be used together with a PV system which is deployed in space or some other substantial distance from the earth's surface.

The maximum power level sensor is preferably manufactured with a recognition of the conditions that the PV array will most frequently encounter. For example, for deployment of a PV system on a rooftop in Delaware, it is estimated that the temperature of the array (during use) will usually be within the range of from about 10° C. to about 65° C., and the irradiance will usually be in the range of up to about 1100 W/m². Accordingly, for such a sensor, the normal working temperature range is from about 10° C. to about 65° C., and the normal working irradiance range is up to about 1100 W/m². Similarly, for deployment of a PV system in some other environment, the normal working temperature range can be determined, as can the normal working irradiance range.

As described below, the reference voltage signal provided by the sensor of the present invention at a specific instant is indicative of the maximum power level of the PV system at that specific instant. The present invention provides a method and apparatus through which, as conditions change such that the maximum power level of the PV system varies, the reference voltage signal generated varies substantially proportionally to the maximum power level of the PV system. Accordingly, the maximum power level of the PV system can be instantaneously estimated by a simple calibration of the reference voltage signal relative to the maximum power level. In addition, if desired, the estimated power levels over a particular time span can be used to provide an estimate of the energy which should have been generated by the PV system over that particular time span.

In a preferred aspect of the present invention, the actual power being produced by the PV system, and/or the actual energy produced by the PV system over time can be determined, and compared with the corresponding values estimated by the maximum power level sensor of the present invention. By making such a comparison, it is possible to determine whether the PV system is producing significantly less power than it should be producing, which may indicate that the PV system is not functioning properly. If the PV system is found to be not functioning properly, the process for carrying out any needed repair, cleaning, modification or other correction can be initiated immediately.

The invention may be more fully understood with reference to the accompanying drawings and the following description. The invention is not limited to the exemplary embodiments and should be recognized as contemplating all modifications within the skill of an ordinary artisan.

BRIEF DESCRIPTION OF THE DRAWING FIGURES

DETAILED DESCRIPTION OF THE INVENTION

Figure 1:
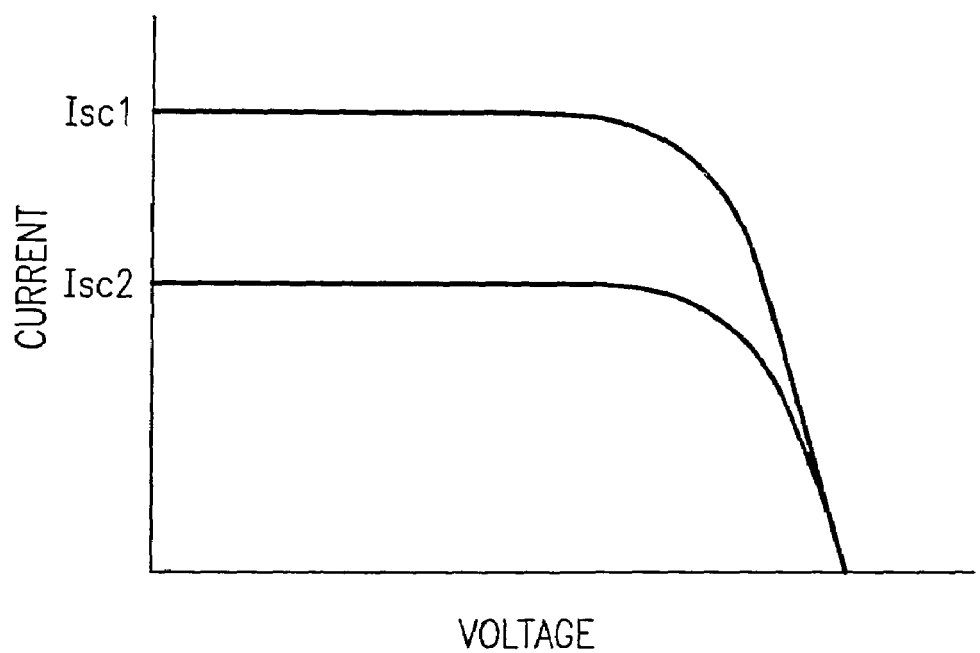
FIG. 1 is a graph showing the character of IV curves for a particular representative photovoltaic cell at two different POA irradiance levels, with temperature and spectrum of sunlight being constant.

As mentioned above, FIG. 1 is a graph showing the character of IV curves for a particular representative photovoltaic cell at two different POA irradiance levels, with temperature and spectral conditions being constant. As shown in FIG. 1, each IV curve is a plot of points each having specific current and voltage coordinates. If a PV cell is producing current at a particular voltage (referred to herein as the "PV cell voltage"), the IV curve indicates the value (or values) that the current can be; likewise, if a particular current is flowing, the IV curve indicates the value (or values) that the PV cell voltage can be. That is, an IV curve is a plot of the possible voltage-current combinations for a particular PV cell being subjected to any particular set of conditions (e.g., POA irradiance, PV cell temperature and spectrum of sunlight).

In a representative example of a PV system in operation, the PV cells contained in a PV array generate current, and circuitry is provided whereby the voltage of such current is controlled. For example, the PV cells in a PV system can be electrically connected to an inverter which converts DC current produced by the PV cell into AC current, and which causes the current produced to be of a particular PV cell voltage. At any given instant, a plot of a point having as its coordinates the current generated by a PV cell in the PV system and the PV cell voltage of that current necessarily lies on the IV curve for that specific PV cell under the prevailing conditions (e.g., POA irradiance, PV cell temperature and spectrum of sunlight).

The PV system is preferably operated such that the PV cell voltage is at or near the optimum instantaneous voltage, i.e., the voltage which, for a PV system having the particular construction of PV cells and at the conditions prevailing at that particular instant, produces the largest power level. The PV cells in the PV system are preferably constructed so that they each have an optimum instantaneous voltage which is the same or substantially the same, under any prevailing conditions. Although operating the PV system at or near its optimum instantaneous voltage could be conducted manually, such operation is preferably done automatically by one (or more) "smart" circuit component which is effective to vary the PV cell voltage so as to continuously be at or near the instantaneous optimum voltage. For instance, where a "smart" inverter is employed, the inverter hunts for an instantaneous optimum PV system voltage under the prevailing conditions by repeatedly varying the voltage and monitoring the power output from the PV system. For example, if an incremental reduction in voltage brings about an increase in power (or if power remains the same), the voltage is again incrementally reduced; if an incremental reduction in voltage brings about a decrease in power, the voltage is then incrementally increased; if an incremental increase in voltage brings about an increase in power (or if power remains the same), the voltage is again incrementally increased; and if an incremental increase in voltage brings about a decrease in power, the voltage is then incrementally decreased. In such a way, a smart inverter in effect causes the output to move along the IV curve for the PV cells in the PV system under the prevailing conditions to find the point on the IV curve at which the product of current times voltage (i.e., power) is the maximum value. When, e.g., the POA irradiance of the incident light changes, so that a different IV curve takes effect, a smart inverter begins hunting for the new optimum voltage.

A wide variety of PV cells are known, having different elements positioned in different ways. In a representative PV cell of "layered construction", the elements include a cover (e.g., made of glass), an anti-reflective coating, an n-type layer (i.e., a semiconductor doped with an n-type dopant), a p-type layer (i.e., a semiconductor doped with a p-type dopant), and a contact grid. Such layered construction PV cells, and other PV cells of different construction, are well known to those of skill in the art, and a more detailed description is not needed here. As mentioned above, regardless of their specific construction, the PV cells in a PV system according to the present invention are preferably constructed such that the instantaneous optimum voltage (under then-prevailing conditions), for each of the PV cells, is approximately or precisely the same. That is, although the instantaneous optimum voltage for each of the PV cells varies as conditions vary, at any given instant, the optimum voltage for all of the PV cells is substantially the same. One way to provide such a PV system is for the respective materials used in constructing the various elements of one PV cell to be the same as those used in constructing each of the other PV cells in the PV system, and for any element dimensions which affect the optimum voltage to be the same or substantially the same in each PV cell. For example, in the case of a PV system comprising a number of PV cells having a layered construction as outlined above, if the respective elements are made of the same materials, and if the thicknesses (and preferably all of the dimensions) of the respective elements are substantially the same, the optimum voltage for each PV cell is approximately the same under any prevailing conditions.

According to the present invention, there is provided a reference cell which, at any given instant, is subjected to approximately or precisely the same conditions (including POA irradiance, temperature, and spectrum of sunlight) as the conditions to which the PV cells contained in the PV array are subjected. Preferably, the reference cell is separate from the PV array, although it is possible for the reference cell to instead be positioned among the cells in the PV array (in which case, it should not be electrically connected to any of the other cells in the PV array).

Figure 2:
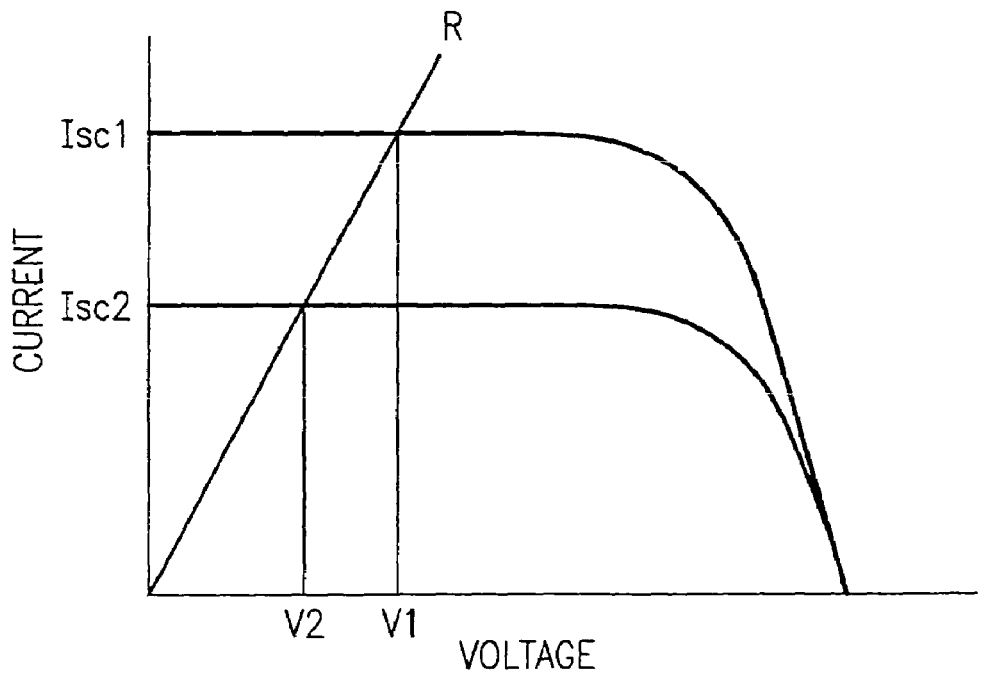
FIG. 2 is a graph which is similar to the graph shown in FIG. 1, and which further includes a load line R which has a slope equal to the inverse of the resistance of a resistor network, and which therefore intersects with each IV curve at the only point having coordinates of current and voltage which are possible across the resistor network.

FIG. 2 provides an illustration to explain the design strategy behind the maximum power level sensor according to the present invention. FIG. 2, like FIG. 1, includes plots of the IV curves for a small reference cell at two different levels of POA irradiance. By providing a resistor network in parallel with the reference cell, at any given POA irradiance level, the cell operates at the intersection of the IV curve for that POA irradiance and a load line (labeled "R" in FIG. 2) which passes through origin and which has a slope equal to the inverse of the resistance of the resistor network. This follows from the fact that 1/resistance= current/voltage, and the IV curve is a plot having current on the Y axis and voltage on the X axis. That is, in any given plot of data:

$$y=mx+b,$$

(where y is the y axis coordinate, x is the x axis coordinate, m is the slope, and b is the y intercept); in the IV curves of FIG. 2:

$$(current) \cdot (resistance) = voltage;$$

or:

$$current = (resistance)^{-1} \cdot (voltage),$$

and current is the y axis coordinate, voltage is the x axis coordinate, (resistance)$^{-1}$ is the slope (m) and the y intercept (b) is zero.

As seen in FIG. 1, respective IV curves for PV cells being struck by light of differing POA irradiance each have a substantially "flat" portion, i.e., a portion where current is substantially constant while voltage varies (e.g., the left parts of the curves shown in FIG. 1, at voltage levels below that where current begins to become reduced). This flat portion current is equal to or approximately equal to the short circuit current ($I_{SC}$), i.e., the current where resistance is negligible.

According to the present invention, it has been observed that (over a substantial range of the normal working temperature range and normal working irradiance range for typical PV array deployments) the magnitude of the short circuit current varies substantially proportionally to irradiance, which is substantially proportional to the maximum power level. That is, the short circuit current at a particular irradiance (i.e., the substantially flat part of the IV curve for that irradiance) is substantially proportional to that irradiance and is substantially proportional to the maximum power level of the IV curve for that irradiance. The reference circuit of the present invention has a resistance across the resistor network which is sufficiently low that for each POA irradiance value (within the range of POA irradiance over which the sensor is to be used), the load line intersects the substantially flat part of the IV curve for that POA irradiance. By doing so, the reference voltage, i.e., the voltage drop across the resistor network, is substantially proportional to the current across the resistor network (i.e., V=I·R); and, since the magnitude of the current across the resistor network is substantially proportional to the maximum power level for the reference cell at the prevailing conditions, the reference voltage is therefore also proportional to the maximum power level for the reference cell at the prevailing conditions.

In practice, the load line R is preferably of a greater slope than what is shown in FIG. 2, (i.e., the resistance of the resistor network is smaller). The load line R depicted in FIG. 2 is of a slope which is smaller than what is preferred merely in order to more clearly illustrate that different POA irradiance values produce a unique voltage across the resistor network.

The discussion above relates to how the method and apparatus of the present invention can sense variation in maximum power point caused by changes in POA irradiance at constant temperature and spectral conditions. As noted above, however, variance in temperature of the PV array also affects the IV curve.

As mentioned above, the spectral response of the PV cells (or the PV cell) in the PV array also affects the maximum power level of the PV array, and the present invention accounts for the spectral response of the PV cell or PV cells in the PV system. Those elements (e.g., a component, a portion of a component, a property of a component or portion thereof, or a dimension of a component or portion thereof) of the reference cell which affect spectral response in such a way as to affect the maximum power level are referred to herein as spectral effect elements. According to the present invention, the spectral effect elements of the reference cell are of substantially identical construction (i.e., substantially identical size and substantially identical material or materials, and made using substantially identical construction techniques) to the corresponding elements of the PV cells in the PV array.

Preferably, all of the elements of the reference cell (including each semiconductor layer, each contact layer, and even any cover and any anti-reflective coating) are substantially identical to the corresponding elements of the PV cells in the PV array. Most preferably, the reference cell is substantially identical to the PV cells, and the reference cell and the PV cells are made by the same manufacturer.

Accordingly, the spectral response of the reference cell is substantially the same as that of the PV cell or PV cells, and therefore does not introduce any error caused by spectral response difference. In addition, any change in the maximum power point of the PV array caused by a change in the spectrum of sunlight is reflected by a corresponding change in the short circuit current of the PV array. By making all of the spectral effect elements of the reference cell (or all of the elements of the reference cell) of substantially identical construction to the corresponding elements of the PV cells, any change in the spectrum of sunlight brings about a corresponding change in the reference voltage signal across the resistor network, and thus affects the reference voltage signal by a factor which is similar to or identical to the factor by which such change in the spectrum of sunlight affects the maximum power level of the PV cells in the PV array. That is, any changes in the maximum power level of the PV array which occur as a result of changes in the spectrum of sunlight are reflected in the reference voltage signal. In addition, where the reference cell and the PV cells in the PV array are of substantially identical construction, any incident angle effects also cannot introduce any error caused by difference in incident angle effect.

As mentioned above, variations in PV array temperature also affect the IV curve of the PV array, and therefore affect the maximum power level of the PV array. The present invention senses variations in the maximum power level which are caused by such variations in array temperature. As described below, according to the present invention, the reference voltage signal is affected by changes in the temperature of the PV array, and therefore reflects changes in the maximum power level which are caused by changes in the temperature of the PV array.

In order for the reference voltage signal (representative of the maximum power level) to reflect changes in the maximum power level caused by changes in temperature of the PV array, the resistor network in parallel with the reference cell comprises at least one negative temperature coefficient thermistor, at least one parallel resistor (i.e., a resistor which is in parallel with the thermistor), and at least one series resistor (i.e., a resistor which is in series with the thermistor and the parallel resistor). The at least one negative temperature thermistor is positioned on or in the PV array, preferably such that its temperature is substantially similar to that of the PV array. The resistance of a negative temperature coefficient thermistor varies inversely relative to temperature; accordingly, a decrease in temperature brings about an increase in the resistance of the thermistor, while an increase in temperature brings about a decrease in the resistance of the thermistor. The effect of temperature on maximum power level, within the normal working temperature range of from about 10° C. to about 65° C., is generally a decrease in maximum power level of about 0.5% per increase of 1° C.

Figure 4:
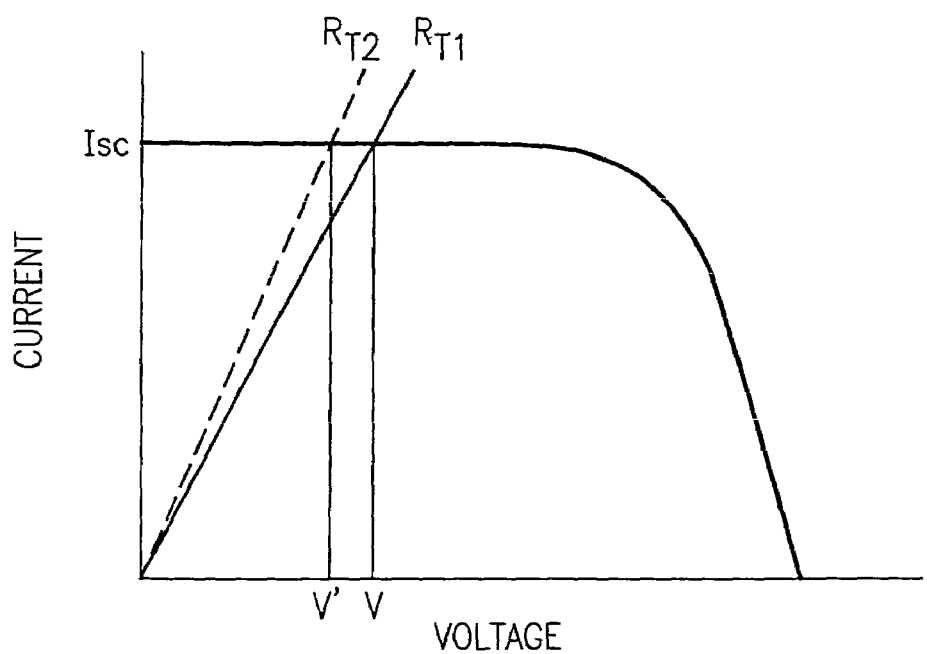
FIG. 4 is a graph showing an IV curve for a particular representative photovoltaic cell at a single POA irradiance level, as well as two load lines having different slopes, corresponding to different resistances of a resistor network of the present invention due to a change in the temperature of the PV array.

When the temperature of the PV array increases, the resistance of the thermistor decreases, and the resistance of the overall reference circuit decreases. Referring to FIG. 4, load line $R_{T1}$ depicts a load line at a first temperature $T_1$, the load line having a slope which is proportional to $1/R_1$, $R_1$ being the resistance of the reference circuit at $T_1$. Load line $R_{T2}$ depicts a load line at a second temperature $T_2$, higher than $T_1$, the load line $R_{T2}$ having a slope which is proportional to $1/R_2$, $R_2$ being the resistance of the reference circuit at $T_2$. As shown in FIG. 4, when the temperature of the PV array increases, the resistance of the reference circuit decreases, and thus the slope of the load line increases, giving rise to an intersection of the load line with the IV curve at a point having a lower voltage coordinate. That is, an increase in temperature results in a lower reference voltage signal, indicative of the decrease in maximum power level.

As mentioned above, the maximum power level sensor is preferably designed with a recognition of the conditions that the PV array will most frequently encounter. A maximum power level sensor therefore preferably includes components of the resistor network, including at least one thermistor, at least one parallel resistor and at least one series resistor, which provide a resistor network whose resistance varies with changes in temperature within the normal working temperature range in proportion to variance of the maximum power level of a PV array receiving light having irradiance within the normal working irradiance range.

Figure 3:
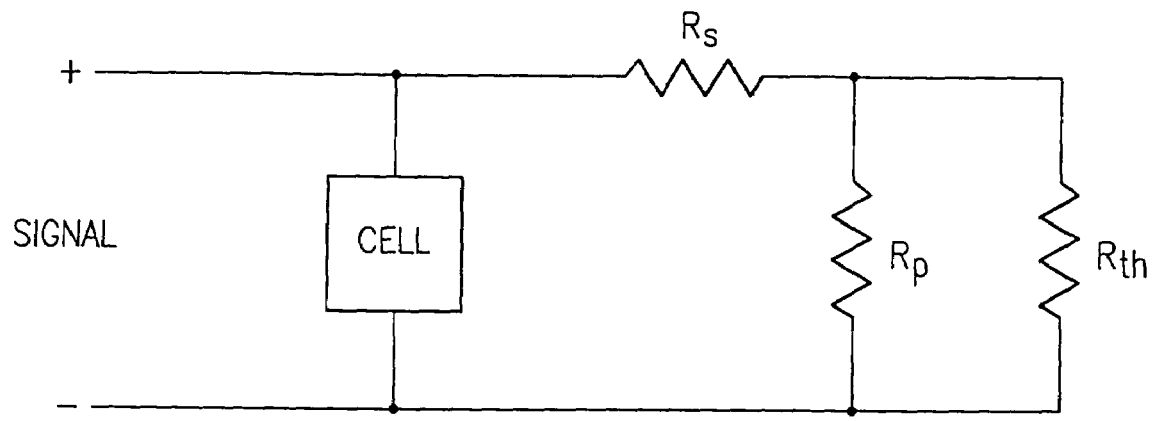
FIG. 3 is a circuit schematic for a maximum power level sensor according to the present invention.

The selection of the resistances of the components of the resistor network can readily be made by straightforward calculation. For example, maximum power level-temperature data can collected. The appropriate equation for calculating the resistance of the thermistor network (based on the variable resistances of each resistor in the thermistor network) is well known. For example, with the thermistor network depicted in FIG. 3, the resistance of the network, $R_n$ is calculated as follows:

$$R_n = R_s + ((R_p \cdot R_{th}/(R_p + R_{th}))).$$

The relationships between resistance and temperature for each resistor in the thermistor network can be inserted into the equation for calculating the total resistance. Then, calculation can be made to determine whether the total resistance varies linearly with respect to the variance of the maximum power point.

Equations for estimating maximum power point current as a function of POA irradiance and temperature for a specific photovoltaic system design are well known, e.g., as described in the scientific literature of this field, or can readily be derived by collecting data using a photovoltaic system of such design. The voltage of the reference voltage signal generated according to the present invention can be calculated by multiplying the short circuit current times the total resistance of the thermistor network. Using such equations, proposed resistances for the at least one parallel resistor and the at least one series resistor can be selected, and at least one thermistor can be selected (whose resistance variance as a function of temperature is provided by the manufacturer or can be derived by collecting data points for resistance at different temperatures), and then various values for POA irradiance and temperature can be input into the different equations to estimate whether the reference voltage signal will vary linearly with respect to the variance of the maximum power point.

Such calculation is preferably simplified using any of a wide variety of software programs in existence for making such calculations. Typically, such software makes it possible to input the derived equation relating maximum power point current to prevailing temperature and POA irradiance, the derived equation relating maximum power point voltage to prevailing temperature and POA irradiance, the equation relating maximum power point to maximum power point current and maximum power point voltage, the equation relating short circuit current to prevailing temperature and POA irradiance, the equation or equations relating resistance to prevailing temperature, the equation relating the reference voltage signal to the short circuit current and total resistance of the thermistor network, and the equation relating total resistance to resistances of the individual resistors and thermistor(s), and the software then selects numerous combinations of temperature and POA irradiance conditions (within their respective normal ranges) and calculates the maximum power point and the reference voltage signal using the various equations (i.e., the software carries out such calculations for a large number of combinations of POA irradiance and temperature), and then the software can give an indication as to the extent to which the reference voltage signal varies linearly with the variance of the maximum power point (as POA irradiance and temperature change within their respective normal ranges). The software then selects a different combination of resistances and thermistor(s) and again performs all such calculations. Resistances and thermistor(s) which provide acceptable linearity between maximum power point and reference voltage signal can then be implemented in systems of such design.

Within the normal working temperature range of from about 10° C. to about 65° C., the resistance of a typical thermistor varies substantially logarithmically with temperature, whereas the maximum power level of a PV array does not vary logarithmically with temperature. In practicing the present invention, the resistance of the parallel resistor (or resistors) and the resistance of the series resistor (or resistors) are thus selected such that the variance of the resistance of the resistor network causes the variance of the reference voltage signal to mimic the variance of the maximum power level. By providing a resistor network whose variance in resistance causes the reference voltage signal variance to mimic the variance of the maximum power level within the normal working temperature range of from about 10° C. to about 65° C., the reference voltage is affected by temperature changes, and thus is indicative of the maximum power level at the prevailing temperature, as well as the prevailing POA irradiance and spectral conditions.

As described above, the maximum power level sensor of the present invention produces a DC voltage signal which is proportional to the maximum power level of the photovoltaic system, and the maximum power level of the PV system can be instantaneously estimated by a simple calibration of the reference voltage signal relative to the maximum power level. For example, the maximum power level sensor can be calibrated by (1) setting up the sensor on a cell or module tester, (2) measuring the signal from the sensor as well as temperature and irradiance, and (3) assigning a "calibration factor", e.g., 50 mV=standard test conditions (1000 W/m$^2$, 25 degrees C., AM 1.5).

The maximum power level sensor of the present invention can optionally further include a display for displaying the reference voltage. The maximum power level sensor of the present invention can additionally or alternatively include a calculator for calculating the estimated maximum power level based on the reference voltage (alternatively, for example, an operator could readily compare a reference voltage reading to a chart of reference voltage readings calibrated to corresponding maximum power level readings in order to estimate the maximum power level). The maximum power level sensor of the present invention can additionally or alternatively include a display for displaying the estimated maximum power level.

Since power is defined as the quantity of energy being delivered per unit of time, the maximum power level sensor of the present invention can readily be used to estimate the quantity of energy which should be produced by a PV system over a period of time (i.e., the area under a plot of maximum power vs. time).

As mentioned above, in a preferred aspect of the present invention, the actual power being produced by the PV system, and/or the actual energy produced by the PV system over time can be determined, and compared with the corresponding values estimated by the maximum power level sensor of the present invention. In order to measure the actual power being produced by the PV system, any suitable power monitor can be employed. A particularly preferred power monitor is disclosed in International Patent Application No. PCT/US02/25876, filed Aug. 13, 2002, entitled "Power and/or Energy Monitor, Method of Using, and Display Device" the entirety of which is hereby incorporated by reference.

Optionally, a device (e.g., a microprocessor) may be provided for digitally comparing the actual power (and/or energy) being produced by the PV system with the estimated power (and/or energy) values obtained according to the present invention. For example, a reference signal for estimated power can be fed into the device, which has logic to determine what power should be produced by the array. Such logic may include factors like inverter efficiency (typically in the range of from about 90% to about 93%). If the device detects that the actual power (and/or energy) is substantially lower than the estimated power (and/or energy), the device can perform any desired function, e.g., recording data, and/or using a phone line to report a problem (using a modem built into the device or into the overall apparatus, following which the service provider can immediately send one or more repair personnel to the site). For instance, a lower value for actual power than estimated can indicate that one or more wires have come loose from the PV array, that the inverter is having a problem finding the optimum system voltage, a shading problem, a need to clean the array, etc.

As mentioned above, although a PV system might include one (or more) "smart" circuit component which hunts for an instantaneous optimum PV system voltage under the prevailing conditions, it is not essential that such a "smart" component be present. In such a system, the maximum power level sensor of the present invention could be used to generate an estimate of the power and/or energy which would be attainable if the system were able to continuously operate at or near the optimum PV system voltage, e.g., to evaluate the benefits which might be obtained by including a "smart" component, e.g., a smart inverter.

Figure 5:
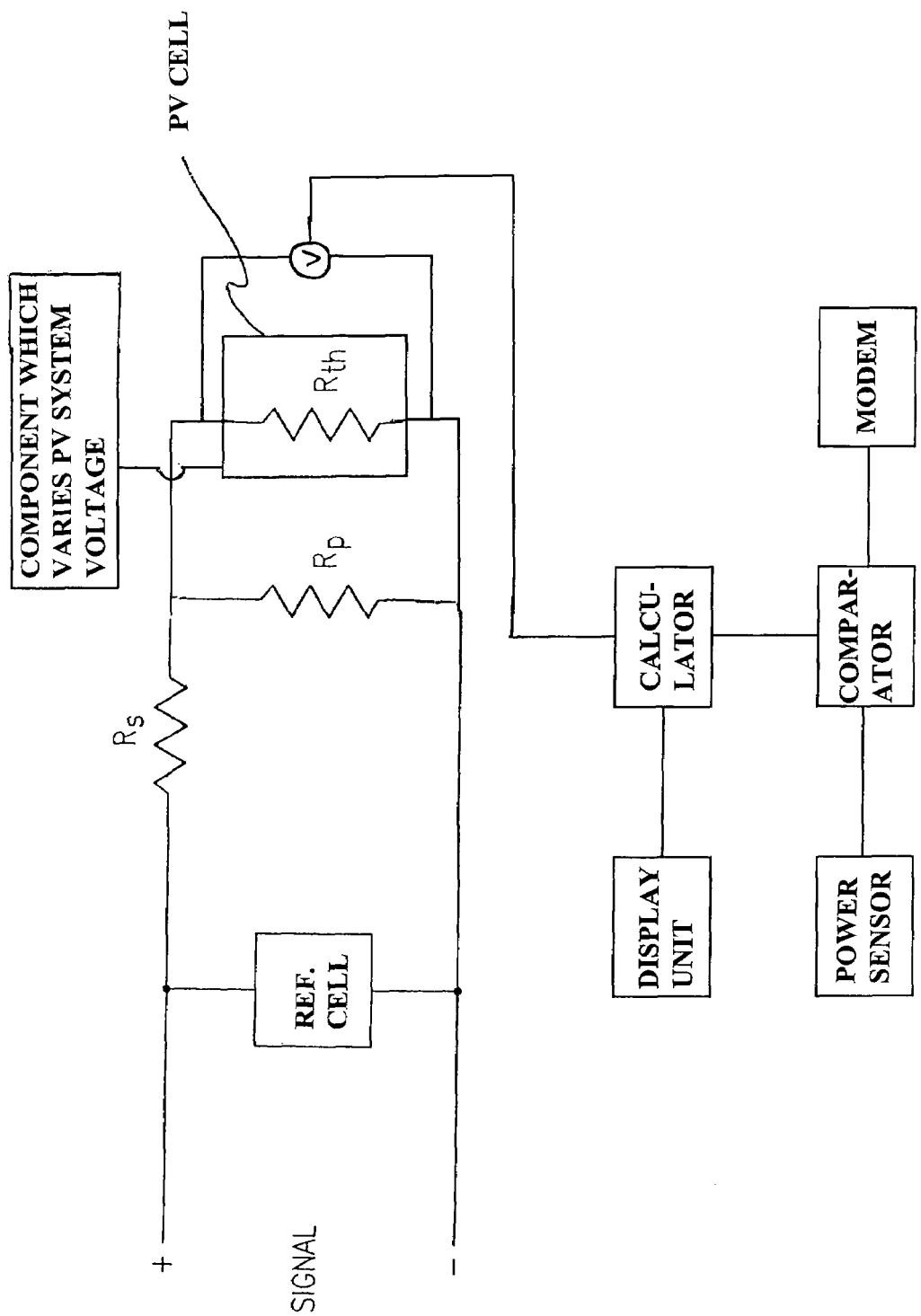
FIG. 5 is a circuit schematic for a maximum power level sensor according to the present invention.

FIG. 5 depicts an embodiment of a PV system according to the present invention, including a thermistor network in parallel with a reference PV cell, in which the thermistor is positioned on a bottom surface of a power PV cell. The system depicted in FIG. 5 further includes a component which varies the PV system voltage, a calculator, a display unit, a comparator, a power sensor and a modem, these components performing the functions as described herein (the comparator performing the function of comparing estimated maximum energy of the PV array with actual quantity of energy produced by the PV array; the display unit displaying estimated maximum energy and/or power of the PV array).

While the present invention is described herein in terms of a PV system having a plurality of PV cells, as indicated above, the principle of the present invention could readily be applied to estimation of the maximum power level of a single PV cell, and the present invention therefore is directed to an apparatus for estimating the maximum power level for a PV array having one or more PV cells.

Although the maximum power level sensor apparatus and methods in accordance with the present invention have been described in connection with preferred embodiments, it will be appreciated by those skilled in the art that modifications not specifically described may be made without departing from the spirit and scope of the invention defined in the following claims. For example, any two or more structural parts of the sensor can be integrated; alternatively, any structural part of the sensor can be provided in two or more parts.

What is claimed is:

1. A PV system including a maximum power level sensor, the system comprising:
   a PV array comprising at least one power PV cell;
   at least one reference PV cell; and
   a thermistor network in parallel with said at least one reference PV cell, said thermistor network comprising at least one negative temperature coefficient thermistor, at least one parallel resistor in parallel with said thermistor, and at least one series resistor in series with said thermistor and said parallel resistor, said thermistor being positioned in or on said PV array.

2. A PV system as recited in claim 1, wherein said thermistor is positioned on a bottom surface of said power PV cell.

3. A PV system as recited in claim 1, further comprising at least one voltage sensor which senses a voltage drop across said thermistor network to provide a reference voltage output.

4. A PV system as recited in claim 1, further comprising a calculator which calculates an estimated maximum power of said PV array.

5. A PV system as recited in claim 1, further comprising a display unit which displays an estimated maximum power of said PV array.

6. A PV system as recited in claim 1, further comprising a power sensor for sensing an actual power level being produced by said PV array.

7. A PV system as recited in claim 4, further comprising a power sensor for sensing an actual power level being produced by said PV array.

8. A PV system as recited in claim 7, further comprising a device for comparing said estimated maximum power of said PV array with said actual power level.

9. A PV system as recited in claim 8, further comprising at least one modem for transmitting data as a result of said comparing said estimated maximum power of said PV array with said actual power level.

10. A PV system as recited in claim 1, further comprising a calculator which calculates an estimated maximum energy of said PV array over time.

11. A PV system as recited in claim 1, further comprising a display unit which displays an estimated maximum energy of said PV array over time.

12. A PV system as recited in claim 1, further comprising an energy sensor for sensing an actual quantity of energy produced by said PV array over time.

13. A PV system as recited in claim 10, further comprising an energy sensor for sensing an actual quantity of energy produced by said PV array over time.

14. A PV system as recited in claim 13, further comprising a device for comparing said estimated maximum energy of said PV array over time with said actual quantity of energy produced by said PV array over time.

15. A PV system as recited in claim 14, further comprising at least one modem for transmitting data as a result of said comparing said estimated maximum energy of said PV array over time with said actual quantity of energy produced by said PV array over time.

16. A PV system as recited in claim 1, wherein all spectral effect elements in said at least one reference PV cell are of substantially identical construction to corresponding elements in said at least one power PV cell.

17. A PV system as recited in claim 1, wherein said at least one reference PV cell is of substantially identical construction to said at least one power PV cell.

18. A PV system as recited in claim 1, further comprising at least one component which varies a PV system voltage so as to continuously be at or near an instantaneous optimum voltage.

19. A PV system as recited in claim 1, further comprising at least one modem for transmitting data sensed by said PV system.

20. A method for estimating the maximum power level of a PV system comprising a PV array comprising at least one power PV cell, the method comprising:

sensing a reference voltage across a thermistor network in parallel with a reference PV cell, said thermistor network comprising at least one negative temperature coefficient thermistor, at least one parallel resistor in parallel with said thermistor, and at least one series resistor in series with said thermistor and said parallel resistor, said thermistor being positioned in or on said PV array, said reference PV cell being subjected to conditions which are substantially similar to conditions to which said at least one power PV cell in said PV array is being subjected.

21. A method as recited in claim 20, further comprising calculating an estimated maximum power of said PV system based on said reference voltage.

22. A method as recited in claim 20, further comprising displaying an estimated maximum power of said PV system based on said reference voltage.

23. A method as recited in claim 20, further comprising estimating a maximum energy output of said PV system over time based on said reference voltage over time.

24. A method as recited in claim 20, further comprising displaying an estimated maximum energy of said PV system over time based on said reference voltage over time.

25. A method as recited in claim 20, wherein said thermistor is positioned on a bottom surface of said power PV cell.

26. A method as recited in claim 20, further comprising sensing an actual power level being produced by said PV system.

27. A method as recited in claim 21, further comprising sensing an actual power level being produced by said PV system.

28. A method as recited in claim 27, further comprising comparing said estimated maximum power of said PV system with said actual power level.

29. A method as recited in claim 28, further comprising transmitting via a modem data as a result of said comparing said estimated maximum power of said PV system with said actual power level of said PV array.

30. A method as recited in claim 20, further comprising transmitting via a modem data sensed by said PV system.

31. A method as recited in claim 20, further comprising sensing an actual quantity of energy produced by said PV system over time.

32. A method as recited in claim 23, further comprising sensing an actual quantity of energy produced by said PV system over time.

33. A method as recited in claim 32, further comprising comparing said estimated maximum energy output of said PV system over time with said actual quantity of energy produced by said PV system over time.

* * * * *